United States Patent [19]

Lehr et al.

[11] Patent Number: 4,482,527
[45] Date of Patent: Nov. 13, 1984

[54] PROCESS FOR REMOVING NITROGEN DIOXIDE FROM OFF-GAS

[75] Inventors: Klaus Lehr, Hürth; Gero Heymer, Erftstadt, both of Fed. Rep. of Germany

[73] Assignee: Hoechst Aktiengesellschaft, Fed. Rep. of Germany

[21] Appl. No.: 538,130

[22] Filed: Oct. 3, 1983

[30] Foreign Application Priority Data

Oct. 16, 1982 [DE] Fed. Rep. of Germany ....... 3238423

[51] Int. Cl.³ .......................... C01B 21/00; B01J 8/00
[52] U.S. Cl. .................................... 423/235; 423/239; 423/316
[58] Field of Search ................... 423/235, 235 D, 239, 423/239 A, 316

[56] References Cited

U.S. PATENT DOCUMENTS 3,437,439  4/1969  Carroll ............................... 423/316
3,904,739  9/1975  Uehara et al. ...................... 423/239

FOREIGN PATENT DOCUMENTS 50-60487  5/1975  Japan .................................. 423/235

*Primary Examiner*—Gregory A. Heller
*Attorney, Agent, or Firm*—Connolly & Hutz

[57] ABSTRACT

The disclosure relates to a process for removing nitrogen dioxide from off-gas. To this end, the disclosure provides for the off-gas to be intimately contacted with a suspension consisting of red phosphorus and a liquid being inert with respect to red phosphorus, e.g. water.

5 Claims, No Drawings

PROCESS FOR REMOVING NITROGEN DIOXIDE FROM OFF-GAS

The present invention relates to a process for removing nitrogen dioxide from off-gas.

Off-gas containing nitrogen dioxide is invariably obtained during commercial production processes. In compliance with a progressive environmental protection policy, increasing demands are being made as to the reduction of nitrogen dioxide emission into the air.

It is known that nitrogen dioxide originating from off-gas can be reacted with water to give nitric acid in accordance with the following equation $$3NO_2 + H_2O \rightarrow 2NHO_3 + NO$$

with the technically adverse effect that the nitrogen monoxide set free can be physically dissolved and washed out with the use of very large quantities of water only (cf. "Ullmanns Enzyklopädie der technischen Chemie", 4th edition, 1981, volume 6, pages 170–174).

Nitrogen dioxide is absorbable with the use of an aqueous sodium hydroxide solution and formation of a nitrite/nitrate-solution for which it is under no circumstances allowable to be introduced into waste-water; it is obligatory for it either to be utilized or to be disposed off in ecologically beneficial fashion (cf. VDI-guideline 2295 (draft), February 1982, pages 6 and 7).

Finally, it is possible for nitrogen dioxide to be reduced to nitrogen by means of ammonia in contact with a $V_2O_5$-catalyst at temperatures of 250° to 300° C. The gaseous reaction mixture still contains 120 ppm $NO_x$ (cf. Chemie-IngenieurTechnik", 47th year (1975), page 1021).

Adverse effects associated with these prior processes reside in that the outgoing air problem becomes a waste water problem or in that the elevated temperatures necessary for effecting the reduction entail considerable expenditure of energy.

It is therefore highly desirable to have a process for removing nitrogen dioxide from off-gas which can practically be carried out at room temperature and which is not liable to entail the formation of non-utilizable by-products.

To this end, the present invention provides more particularly a process for removing nitrogen dioxide from off-gas which comprises intimately contacting the off-gas with a suspension consisting of red phosphorus and a liquid being inert with respect to red phosphorus.

Further preferred and optional features of the present invention provide:

(a) for the red phosphorus to be used in the form of particles with a size of up to 5 mm;
(b) for the liquid being inert with respect to red phosphorus to be water;
(c) for the off-gas to be intimately contacted with the suspension under pressure.

In the process of this invention, the nitrogen dioxide undergoes reduction already at atmospheric pressure to give nitrogen and traces of dinitrogen oxide.

In accordance with this invention, the red phosphorus is oxidized to given phosphorous acid and phosphoric acid, in the molar ratio of 1:1. As regards the concentration of acid in the suspension, it is possible for it to reach a value higher than 30 weight % without the redox reaction being adversely affected.

The process of this invention makes it possible for the acid obtained in the suspension to be readily used—after separation of red phosphorus—e.g. in the fertilizer industries. In other words, no waste material difficult to work up or dispose of is obtained.

Needless to say the present process can be carried out continuously or discontinuously.

The apparatus used for carrying out the process should be provided with means permitting the production of very fine gas bubbles whereby it is ensured that the red phosphorus suspended in the liquid is intimately contacted with the off-gas containing nitrogen dioxide. To produce such gas bubbles, use should preferably be made of a suitable agitator or gas distributing plate receiving the incoming gas from below, e.g. a frit or fine-meshed gauze. It is also possible however to use a column, e.g. a packed column through which the off-gas containing nitrogen dioxide and red phosphorus suspended in the liquid are passed countercurrently with respect to one another. Last but not least it is possible to improve the removal of nitrogen dioxide from off-gas by arranging a plurality of those means one downstream of another so as to have a cascade arrangement.

The results obtainable by the process of this invention are illustrated in the following Examples.

EXAMPLE 1

The reactor was a cylindrical glass vessel (80 mm wide and 300 mm high) which was provided with a frit (D1). Placed above the frit was a suspension of 500 ml water and 100 g red phosphorus (consisting of particles of which 95% had a size of less than 0.4 mm; a commercially available product of HOECHST AG, Werk Knapsack, Federal Republic of Germany), whilst nitrogen containing nitrogen dioxide was forced to flow through the frit from below, at a rate of 100 l/h. Very fine gas bubbles were found to form above the frit and ascend in the liquid. Specimens were taken after 20 minutes.

Analysis:
Ahead reactor: 208 mg $NO_2/l$ ($\cong$63 mg N/l).
Behind reactor: 9.9 mg N/l (in form of $NO_2 + NO$).
Conversion rate: 84%.
Temperature: 22° to 24° C.

EXAMPLE 2

Example 1 was repeated but nitrogen containing more nitrogen dioxide was forced to flow through the reactor and specimens were taken after 30 minutes.

Analysis:
Ahead reactor: 320 mg $NO_2/l$ ($\cong$97 mg N/l).
Behind reactor: 13.1 mg N/l (in form of $NO_2 + NO$).
Conversion rate: 87%.
Temperature: 21° to 25° C.

EXAMPLE 3

Example 1 was repeated but nitrogen containing less nitrogen dioxide was forced to flow through the reactor and specimens were taken after 40 minutes.

Analysis:
Ahead reactor: 24.4 mg $NO_2/l$ ($\cong$7.4 mg N/l).
Behind reactor: 0.9 mg N/l (in form of $NO_2 + NO$).
Conversion rate: 88%.
Temperature: 24° to 26° C.

EXAMPLE 4

Example 3 was repeated but the aqueous suspension of red phosphorus was admixed with phosphoric acid so as to establish a pH of 1.8 prior to passing the gas mixture therethrough, and specimens were taken after 36 minutes.

Analysis:
 Ahead reactor: 27.8 mg $NO_2/l$ ($\cong$8.3 mg N/l).
 Behind reactor: 0.9 mg N/l (in form of $NO_2+NO$).
 0.9 mg N/l (in form of $N_2O$).
Conversion rate: 89%.
Temperature: 24° to 26° C.

The detected quantity of dinitrogen oxide was ignored in determining the conversion rate as dinitrogen oxide is harmless in this concentration.

EXAMPLE 5

Example 1 was repeated but the aqueous suspension of red phosphorus was admixed with phosphoric acid so as to establish a pH of 0.6 prior to passing the gas mixture therethrough, and specimens were taken after 15 minutes.

Analysis:
 Ahead reactor: 217 mg $NO_2/l$ ($\cong$66.1 mg N/l).
 Behind reactor: 4.8 mg N/l (in form of $NO_2+NO$).
 17.2 mg N/l (in form of $N_2O$).
Conversion rate: 98%.
Temperature: 30° to 53° C.

In determining the conversion rate, the dinitrogen oxide was ignored (cf. Example 4).

EXAMPLE 6

The reactor was cylindrical glass vessel (100 wide, 900 mm high) provided with a coarse-meshed frit. Placed above the frit was a suspension consisting of 4 l water and 800 g red phosphorus (consisting of particles of which 95% had a size smaller than 0.4 mm, a commercially available product of HOECHST AG, Werk Knapsack) whilst air charged with nitrogen dioxide was forced to flow through the frit from below at a rate of 2400 l/h. Specimens were taken after 30 minutes.

Analysis:
 Ahead reactor: 2000 volume ppm $NO_2$.
 Behind reactor: 560 volume ppm $NO_2$.
Conversion rate: 72%.
Temperature: 24° C.

In a comparative test, the aqueous suspension of red phosphorus introduced into the reactor was replaced by 4 l water. The conversion rate was as low as 44% under otherwise identical reaction conditions.

EXAMPLE 7

Two of the reactors described in Example 1 maintained at constant temperature of which each was charged with a suspension of 100 g red phosphorus (consisting of particles of which 95% has a size smaller than 0.4 mm; a commercially available product of HOECHST AG, Werk Knapsack) in 500 ml water, were arranged one downstream of the other. Nitrogen containing nitrogen dioxide was forced to flow through each of the two reactors at a rate of 100 l/h. Specimens were taken after 60 minutes.

Analysis:
 Ahead reactor I: 380 mg $NO_2/l$ ($\cong$116 mg N/l).
  Behind reactor I: 18.6 mg N/l (in form of $NO_2+NO$).
 Conversion rate: 84%.
 Analysis:
  Ahead reactor II: 18.6 mg N/l (in form of $NO_2+NO$).
  Behind reactor II: 9.1 mg N/l (in form of $NO_2+NO$).
 Conversion rate: 51%.
 Total conversion rate: 92%.
 Temperature: 23° C.

We claim:

1. A process for removing nitrogen dioxide from off-gas which consists essentially of intimately contacting the off-gas with an aqueous suspension of red phosphorus particles having particle sizes of up to 5 mm, with the resultant formation of a gaseous phase consisting essentially of nitrogen and traces of dinitrogen dioxide and a liquid phase comprising phosphorous acid and phosphoric acid.

2. A process as claimed in claim 1 wherein the aqueous suspension comprises water and red phosphorus particles in a weight ratio of about 5:1.

3. A process as claimed in claim 1, wherein the phosphorous acid and phosphoric acid are formed in a molar ratio of 1:1.

4. A process as claimed in claim 2, wherein the phosphorous acid and phosphoric acid are formed in a molar ratio of 1:1.

5. The process as claimed in claim 1, wherein the off-gas is intimately contacted with the suspension under pressure.

* * * * *